United States Patent [19]
Fort

[11] Patent Number: 5,662,422
[45] Date of Patent: *Sep. 2, 1997

[54] BIFURCATED KEYBOARD ARRANGEMENT

[76] Inventor: Chris Fort, 111 - 23rd Ave. North, Nashville, Tenn. 37203

[*] Notice: The term of this patent shall not extend beyond the expiration date of Pat. No. 5,393,150.

[21] Appl. No.: 327,671

[22] Filed: Oct. 21, 1994

Related U.S. Application Data

[63] Continuation-in-part of Ser. No. 87,364, Jul. 8, 1993, Pat. No. 5,393,150, which is a continuation-in-part of Ser. No. 755,563, Sep. 5, 1991, Pat. No. 5,228,791.

[51] Int. Cl.$^6$ ............................................. B41J 5/10
[52] U.S. Cl. ............................................. 400/489; 400/486
[58] Field of Search ............................. 400/486, 488, 400/489, 82, 472; 248/917, 918, 919, 923, 721, 920, 922, 921, 181; 403/123, 121, 119, 103, 104, 93

[56] References Cited

U.S. PATENT DOCUMENTS

| | | | |
|---|---|---|---|
| 4,068,961 | 1/1978 | Ebner et al. | 403/55 |
| 4,081,068 | 3/1978 | Zapp | 197/98 |
| 4,415,136 | 11/1983 | Knoll | 248/181 |
| 4,483,634 | 11/1984 | Frey et al. | 400/489 |
| 4,554,590 | 11/1985 | Chelin et al. | 358/248 |
| 4,570,892 | 2/1986 | Czech et al. | 248/372.1 |
| 4,620,813 | 11/1986 | Lacher | 403/93 |
| 4,785,190 | 11/1988 | Frankena | 250/503.1 |
| 5,004,196 | 4/1991 | Gross | 248/118.3 |
| 5,044,798 | 9/1991 | Roylance et al. | 400/472 |
| 5,067,834 | 11/1991 | Szmanda et al. | 400/489 |
| 5,073,050 | 12/1991 | Andrews | 400/82 |
| 5,122,786 | 6/1992 | Rader | 340/211 |
| 5,143,462 | 9/1992 | Klauber | 400/486 |

FOREIGN PATENT DOCUMENTS

| | | |
|---|---|---|
| 0195313 | 4/1989 | Japan . |
| 8902369 | 3/1989 | WIPO . |
| 9301054 | 1/1993 | WIPO . |

*Primary Examiner*—Edgar S. Burr
*Assistant Examiner*—Anthony H. Nguyen
*Attorney, Agent, or Firm*—Evenson, McKeown, Edwards & Lenahan P.L.L.C.

[57] ABSTRACT

A keyboard arrangement in which a conventional keyboard is divided into two sections, each of which is separately supported on a joint which is freely rotatable and pivotable. The joint in turn may have a supporting base adapted to rest on or to be clamped to a table top or other support surface. Alternatively, the joints supporting the respective keyboard sections may be mounted on a supporting based member, which may have an adjustable width so that the separation between the two keyboard sections can be varied. The sections may have palm rests thereon.

13 Claims, 12 Drawing Sheets

BIFURCATED KEYBOARD ARRANGEMENT

BACKGROUND AND SUMMARY OF THE INVENTION

This is a continuation-in-part application of prior application Ser. No. 08/087,364, filed Jul. 8, 1993, now U.S. Pat. No. 5,393,150 which is a continuation-in-part of prior application Ser. No. 07/755,563, filed Sep. 5, 1991, now U.S. Pat. No. 5,228,791 of Chris Fort entitled Bifurcated Keyboard Arrangement.

The present invention relates to an improved keyboard arrangement for a computer, word processor or other keyboard operated device.

The development of information processing technology has resulted in creation of a new occupational specialty: the rapid inputting of large amounts of data into an information processing system. Typically, this function is performed by an operator who sits at a video display terminal and inputs information by depressing keys on a keyboard. Examples of such occupational specialists include secretaries, accounting or bookkeeping personnel, and those performing other clerical functions. In some instances, such a keyboard operator may spend as many as eight to twelve hours per day inputting information on a computer type keyboard.

While similar clerical information processing functions have been performed for many years, recent developments have accentuated the repetitive nature of the task. In particular, the replacement of the a manual and electric typewriter by computers and word processors has eliminated many of the previously required ancillary operations, such as periodic carriage return, putting paper into the machine, and the like. While these advances in turn have resulted in a desirable increase in productivity, that is, speed and efficiency of the information inputting function, they have at the same time eliminated almost altogether all departures from the purely repetitive motion involved in performing the inputting of information. It has been estimated, for example, that an efficient keyboard operator may strike up to 12,000 keys per hour on a sustained basis.

One result of this evolutionary specialization is the recognition of a new type of occupational injury known as "cumulative trauma disorder" ("CTD"). CTD's differ from the more traditional forms of job related illnesses in that they are not directly traceable to any single incident or accident, but rather develop over a protracted period due to sustained performance of harmful repetitive motions. A particular type of CTD which is especially prevalent among keyboard operators is carpal tunnel syndrome, a degenerative disease involving injury to the nerves which pass through the wrist from the forearm to the hand due to inflammation of the tendons which run together with them through an opening known as the carpal tunnel. If left untreated, the symptoms of carpal tunnel syndrome become progressively more severe and can prove painful and debilitating, as well as costly.

One of the environmental factors which has been the focus of much attention in recent years as a potential cause of CTD's or carpal tunnel syndrome in particular, is the configuration of the well established design for computer keyboards. Heretofore, commercially available keyboards have almost invariably been manufactured as a planar array of keys which is typically inclined toward the operator at an elevation of several degrees. In order to operate such a keyboard, it is necessary for the operator to pronate his wrists by about 30° so that the palms of his hands face substantially directly downward toward the flat surface of the keyboard, and the tips of his fingers are therefore elevated above the keys at an approximately equal distance. At the same time the wrists must be bent upwards by a few degrees in order to accommodate the incline of the keyboard. Such an unnatural positioning of the hands, wrists and forearms accompanied by long term repetitive motions of the wrists and fingers as the keys are struck can cause the sort of irritation of the tendons in the carpal tunnel which can lead to carpal tunnel syndrome.

Recently, numerous efforts have been made to develop a keyboard configuration which eliminates, or at least minimizes, the need for such awkward orientation of the hands, wrists and forearms. One example of such a redesigned keyboard is disclosed in U.S. Pat. No. 4,597,681 in which the keyboard is divided laterally into two halves supported on rectangular base plates which are connected by a transverse hinge so that they may be elevated at an angle relative to each other in an inverted V configuration. In addition, each of the keyboard halves is pivoted at one corner thereof, so that it may be rotated relative to the supporting base plate, thus allowing the orientation of the halves to be adjusted relative to each other. However, the extent to which such adjustment can be accommodated is significantly limited by the mechanical configuration of the support mechanism.

Another bifurcated keyboard arrangement is disclosed in U.S. Pat. No. 4,661,005, in which the respective keyboard halves are slidable transversely outward relative to each other along a track affixed to the edge of a table which supports a video screen. In addition, each keyboard half is hinged along a horizontal axis parallel to the track so that it may rotated downward (and thus inclined toward the operator) and is pivoted so that it may also rotate about a second horizontal axis perpendicular to the track. In this manner the relative orientation of the two keyboard halves is once again adjustable within a range which, however, is limited by the mechanical constraints of the hinges and tracks, etc. In addition, the supporting apparatus requires specially fabricated hardware which makes it relatively expensive and not easily portable or interchangeable with a conventional commercial keyboard.

Other efforts to develop an adjustable keyboard arrangement, such as U.S. Pat. No. 4,509,873, suffer from similar disadvantages.

One object of the present invention, therefore is to provide a bifurcated keyboard arrangement in which the separated sections are easily adjustable in a virtually limitless range of orientations to conform to the comfort requirements of an operator.

Another objective of the present invention is to provide a bifurcated keyboard arrangement which is simple and inexpensive to manufacture.

Yet another objective of the present invention is to provide a bifurcated keyboard arrangement which is compact, convenient and easily portable.

Still another object of the invention is to provide a bifurcated keyboard arrangement in which the keyboard sections are freely rotatable about three mutually perpendicular axes, thus providing, among other things, the ability to rotate each keyboard section away from the operator in order to achieve any desired position necessary to provide ergononmetric relief to the operator.

A further object of the invention is to provide a bifurcated keyboard arrangement in which the keyboard sections can be easily rotated in place, without disturbing the lateral spacing thereof.

Finally, another objective of the present invention is to provide a bifurcated keyboard arrangement which may be quickly and easily connected to a computer or other information processing device and used as a replacement for a conventional commercial keyboard, without the need for elaborate specially fabricated hinges, tracks or other special purpose hardware.

These and other objects and advantages are achieved according to the invention in which a conventional keyboard is divided into two sections, each of which is supported on a joint, which is freely rotatable and pivotable, such as a conventional ball and socket joint or a joint of a type commonly used to support computer monitors. The joint in turn may have a support adapted to rest on a table top or other support surface, or it may be mounted on a suction cup adapted to adhere to such a supporting surface. In another embodiment, the pivotable joint has a supporting clamp which an be affixed to the edge of a supporting table. In a further embodiment, the pivotable joint is supported on arms which are themselves pivotably mounted to a table in a conventional manner, or may be clamped to a table edge. In yet another preferred embodiment, the joints supporting the respective keyboard sections are mounted on a base assembly, which may be have an adjustable width so that the separation between the two keyboard sections can be varied. In yet another preferred embodiment, the sections have palm rests thereon.

Other objects, advantages and novel features of the present invention will become apparent from the following detailed description of the invention when considered in conjunction with the accompanying drawings.

DETAILED DESCRIPTION OF THE DRAWINGS

Figure 1:
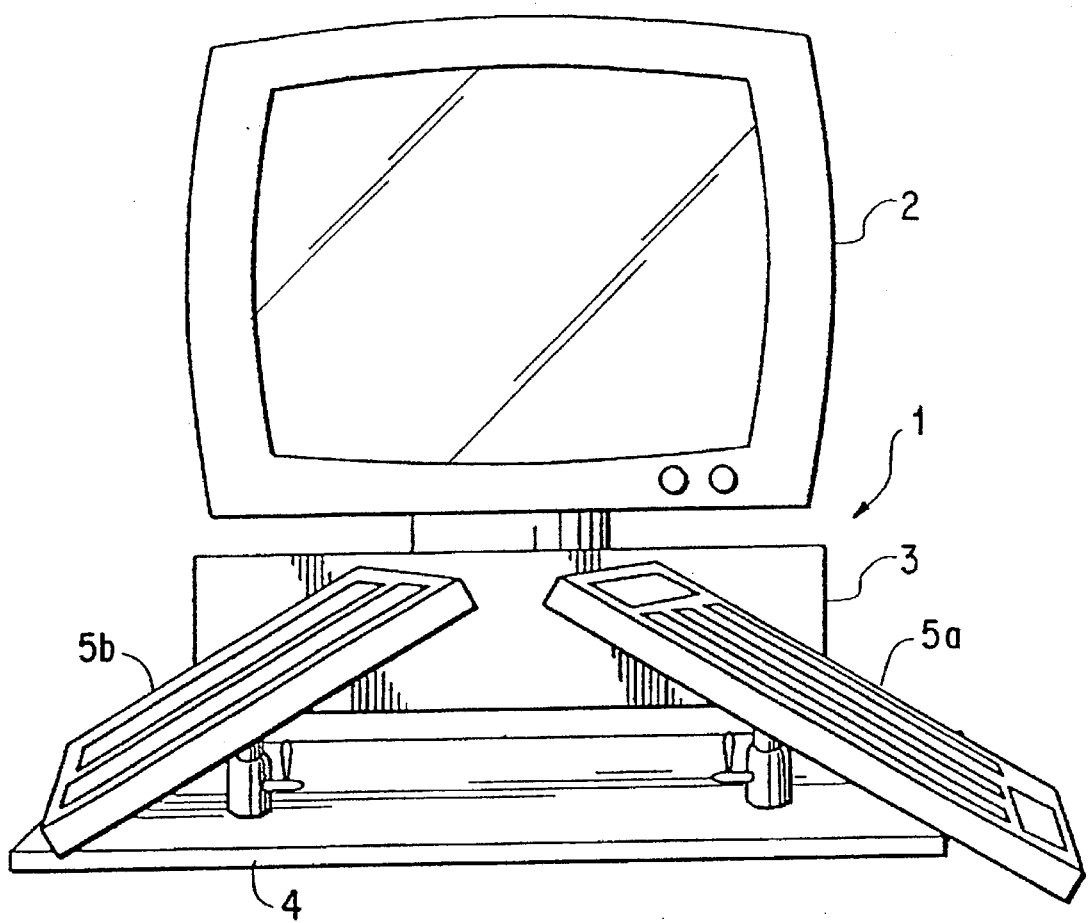
FIG. 1 is a perspective view of a video display terminal which incorporates a bifurcated keyboard arrangement according to the invention.

Referring now to FIG. 1, a video display terminal, designated generally by reference numeral 1, includes a video display unit 2 supported on a disk drive unit 3 which in turn rests on a supporting surface 4, which may be a table top, computer stand or the like. Bifurcated keyboard sections 5a and 5b are supported respectively on freely rotatable and pivotable joints 6a and 6b, such as depicted in FIG. 4.

Figure 2A:
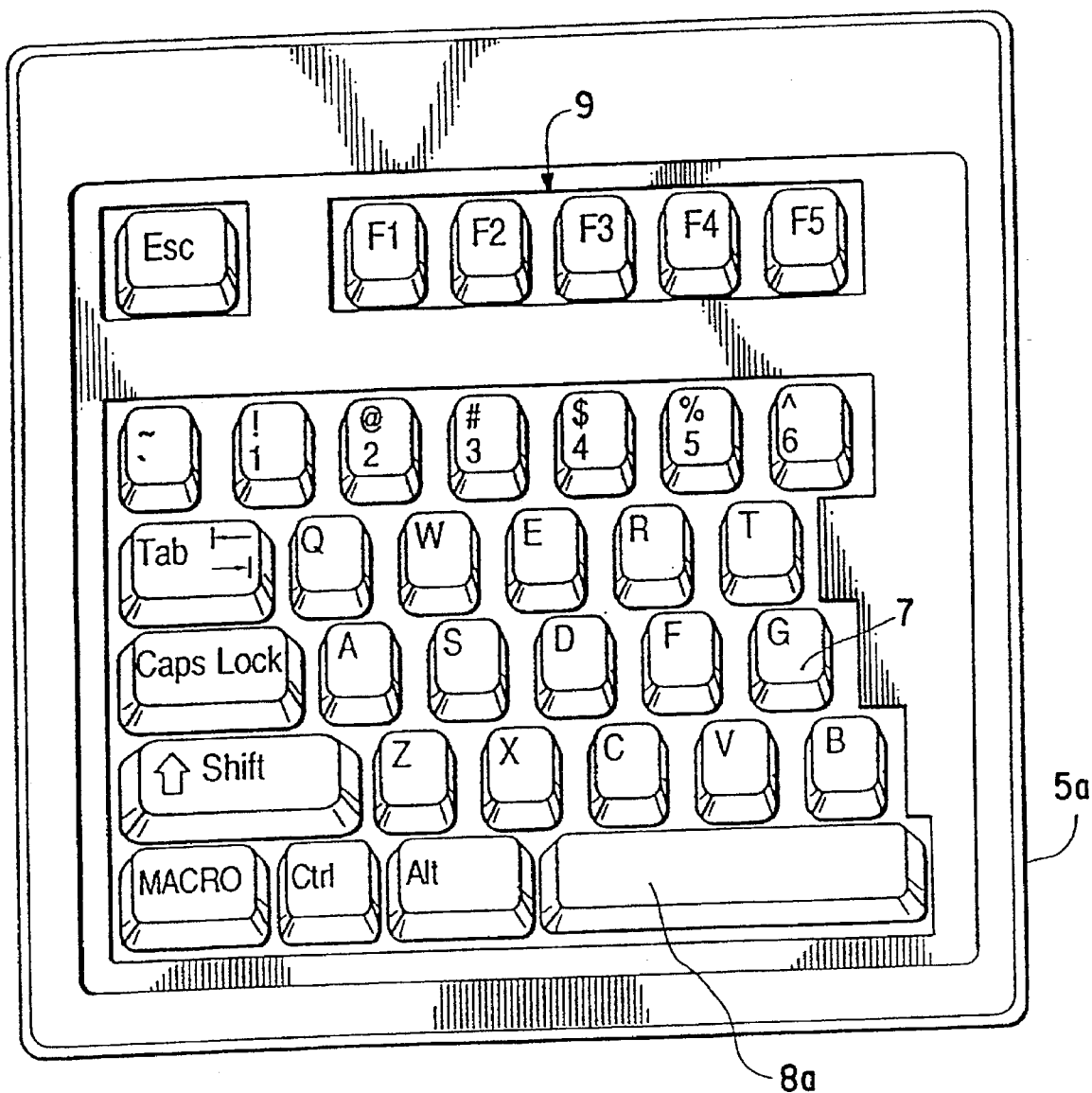
FIGS. 2a and 2b are top views of the two halves of a bifurcated keyboard arrangement according to the invention, showing one possible manner in which the sections may be divided.
Figure 2B:
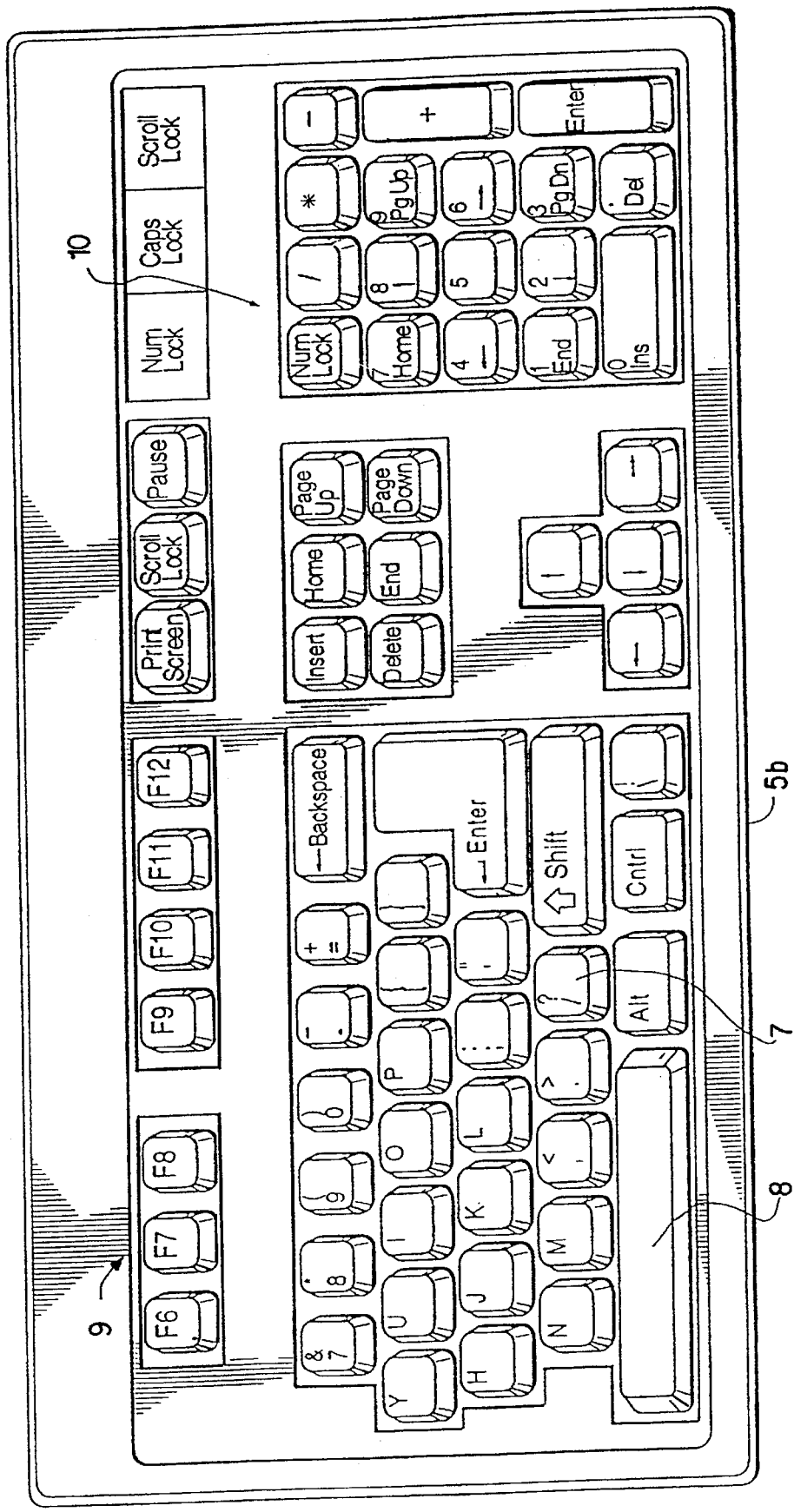

FIGS. 2a and 2b are top elevation views of keyboard sections according to the invention which show the manner of separation of the two keyboard sections. Each keyboard section 5a, 5b carries a plurality of keys 7, in this instance laid out according to standard QWERTY arrangement, in which the space bar is an elongated key situated along the front or bottom of the keyboard. Because the space bar may be operated with either thumb, according to the preference of the operator, in this instance, the space bar is in two parts 8a and 8b on keyboard sections 5a and 5b respectively, each part being somewhat longer than one half the length of the standard space bar in order to accommodate the natural extension of the operator's thumb toward the middle of the keyboard.

It will of course be appreciated that keyboard layouts other than the standard QWERTY arrangement can be accommodated by the invention, and that other divisions of the respective keyboard sections are also possible. In this regard, it is not necessary that the respective sections 5a and 5b be exactly half of the combined keyboard 8, since asymmetrical divisions are also possible. Moreover, it will also be appreciated that most "standard" computer keyboards contain groupings of certain function keys 9 and a number pad 10 to the right of the alphabetic keys, and thus generally symmetric division of the alphabetical keys as shown in FIG. 2 will result in a division of the overall keyboard in which the right section is significantly larger than the left section. Of course, for certain applications, it may be desirable to omit particular keys or key groupings, such as the number pad, which may also be accommodated within the scope of the invention.

Figure 3:
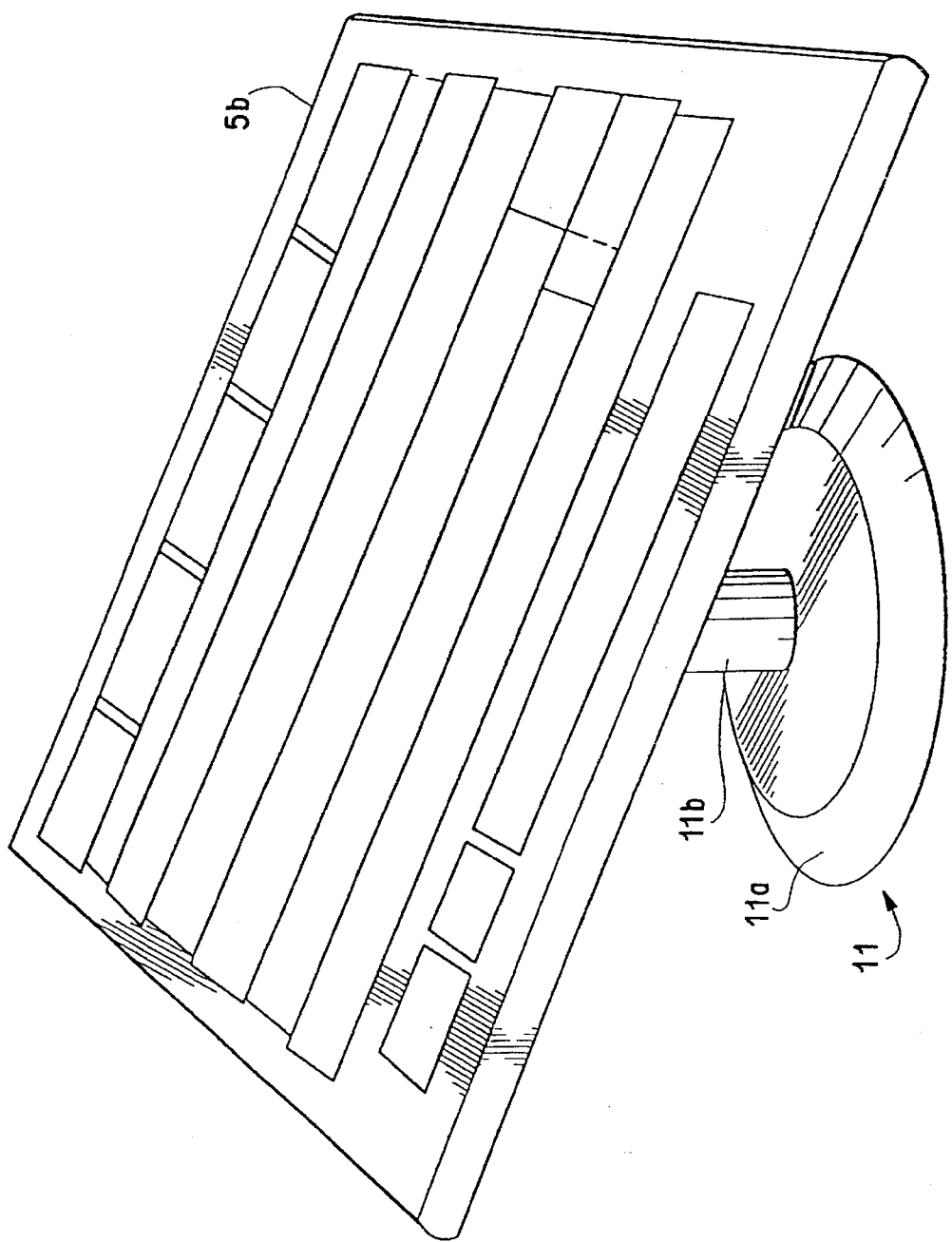
FIG. 3 is a perspective view of the right hand section of a bifurcated keyboard arrangement according to the invention, showing the section inclined in one possible orientation.
Figure 4:
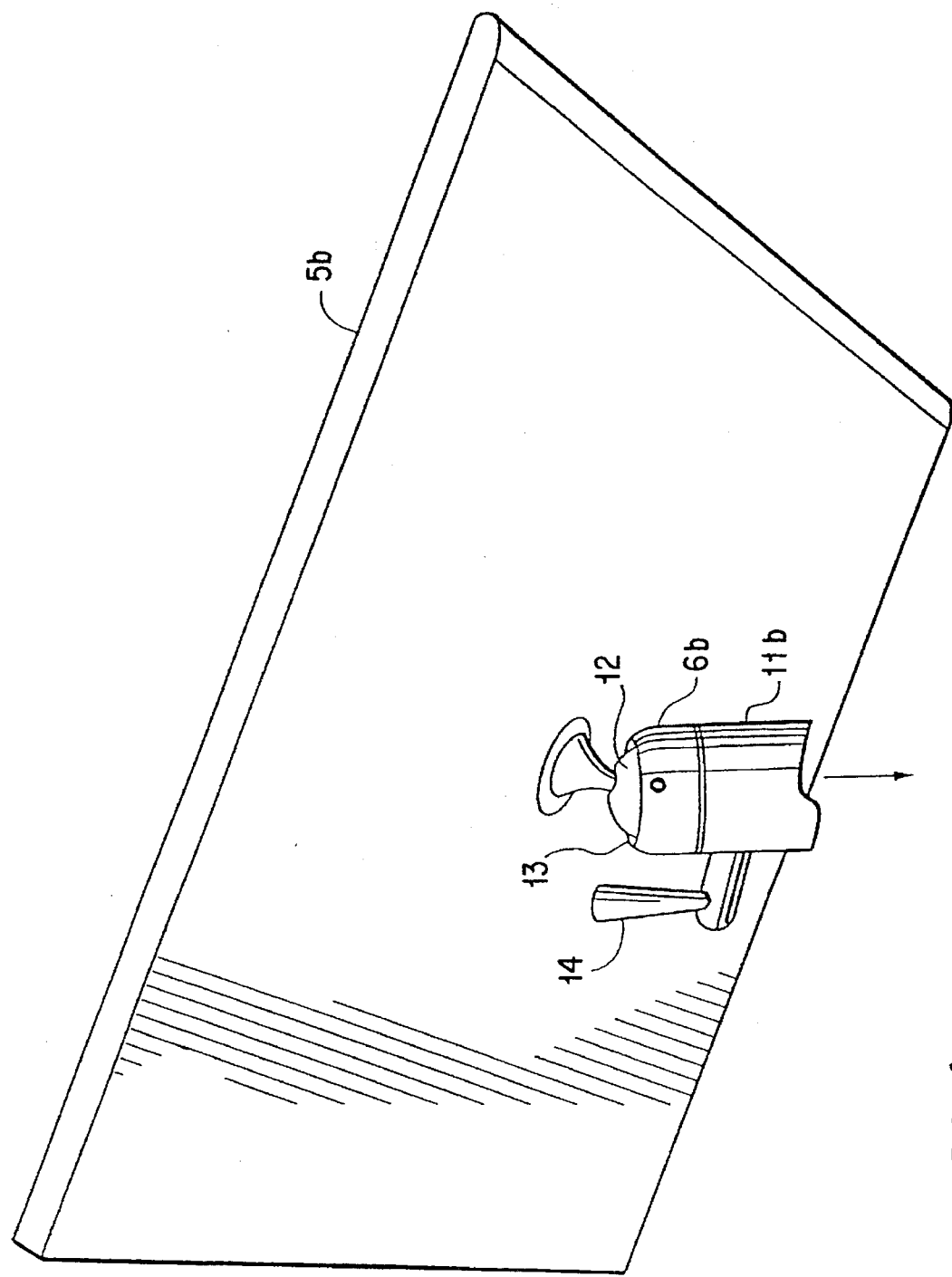
FIG. 4 is a perspective view of the keyboard section of FIG. 3, viewed from the rear underneath side and showing the details of the ball and socket joint.

Referring now to FIGS. 3 and 4, there is shown the right keyboard section 5b of the keyboard supported on ball and socket joint 6b (FIG. 4) and which includes a planar element 11a and an elongated member 11b projecting upward therefrom. In FIG. 3, the keyboard section is included toward the operator and to the operator's right, and rotated slightly in a clockwise direction as viewed from the top. This particular orientation of course must be regarded as representative only of a single possibility, as it is apparent that the unit may be oriented in an infinite variety of positions, which in this embodiment are limited by the plane of the supporting surface, which constrains the downward movement of any corner or edge of the keyboard half.

FIG. 4 is a perspective view of the underneath side of the keyboard half shown in FIG. 3. Ball and socket joint 6b is of conventional construction, having a ball element seated in socket 13 formed in the upper end of elongated member 116, with a lever 14 which is tightened in order to lock the joint in a particular position. Such ball and socket joints are commercially available, for example from Slik, America, Inc.

Figure 5:
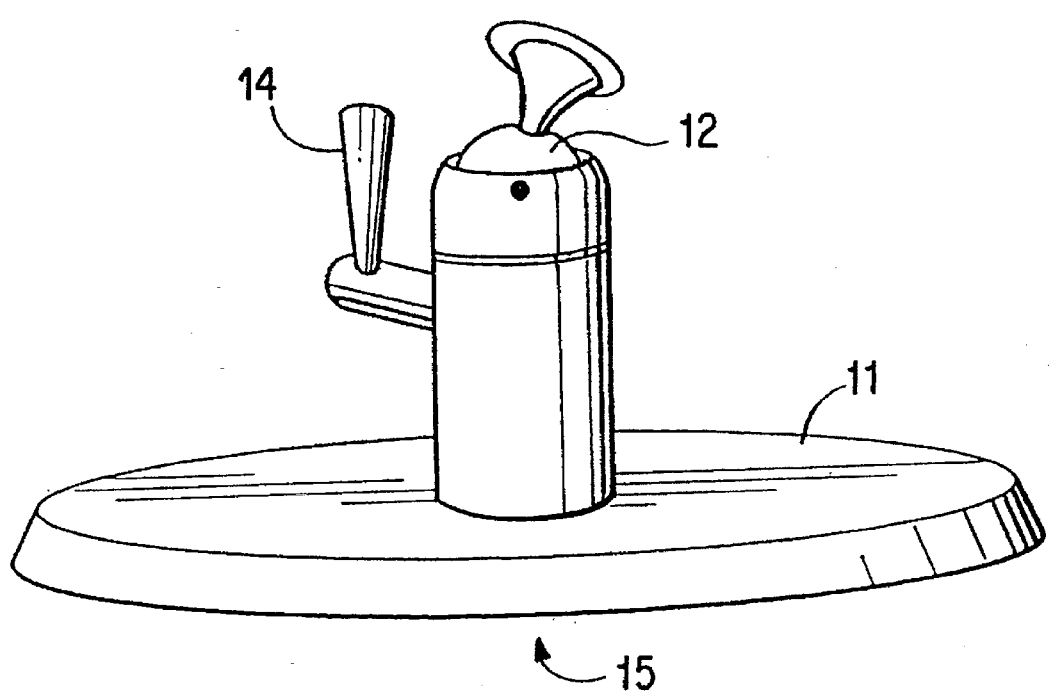
FIG. 5 depicts a ball and socket joint of the type shown in FIG. 4 mounted on a support.

FIG. 5 shows a ball and socket joint 6b of the type referred above, with a weighted support 11 having a planar bottom surface 15 with a diameter of at least % the width of keyboard section 6b in order to prevent its tipping over. It will of course be appreciated that other supporting elements may be substituted for the support shown in FIG. 5, such as for example a conventional suction cup mounting or a stand having three or more legs, such as a tripod may be used. The ball and socket joint may also be supported on a clamp unit, which may be clamped to the edge of a table or other supporting surface. Finally, the ball and socket joint may be mounted on a supporting arm, which itself is mounted by means of a ball and socket or other comparable joint to a supporting surface, or alternatively may be clamped to the supporting surface by clamp members in a conventional manner.

Figure 6:
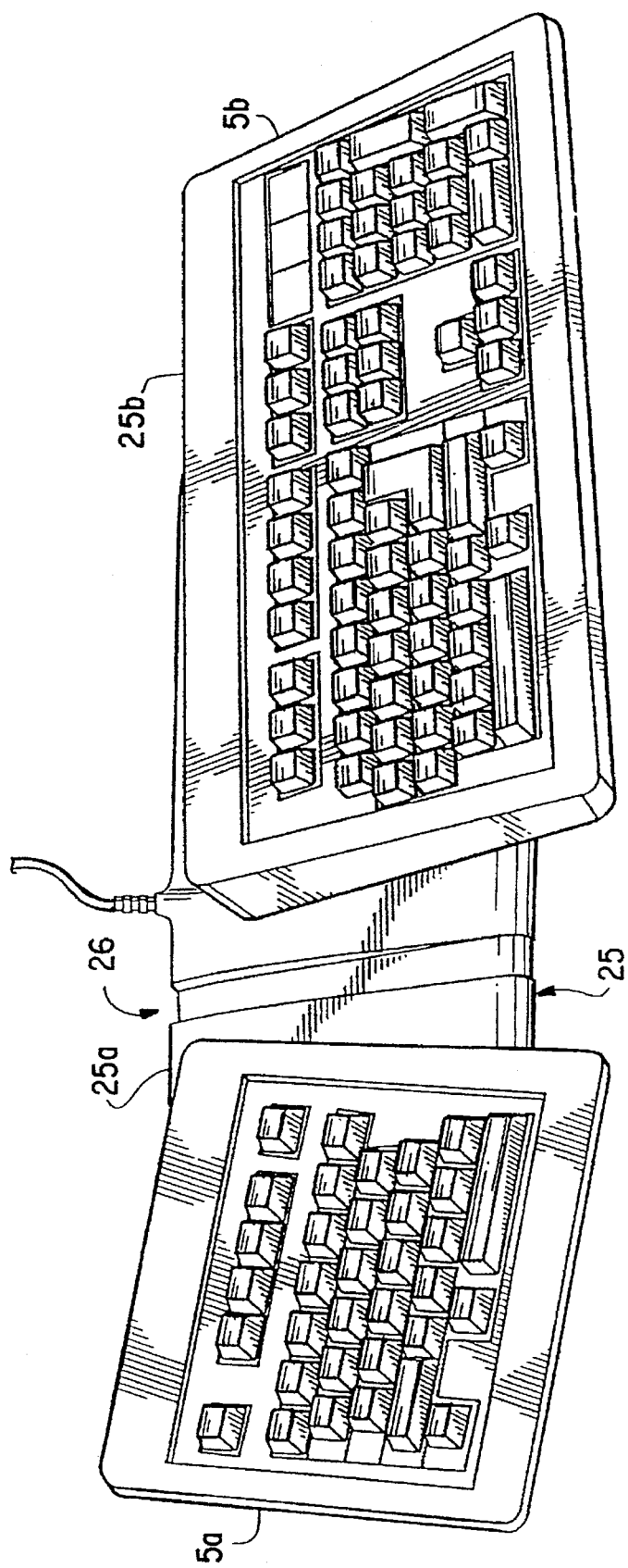
FIG. 6 is a perspective view of another embodiment of the invention in which both keyboard sections are mounted on a base assembly.
Figure 8:
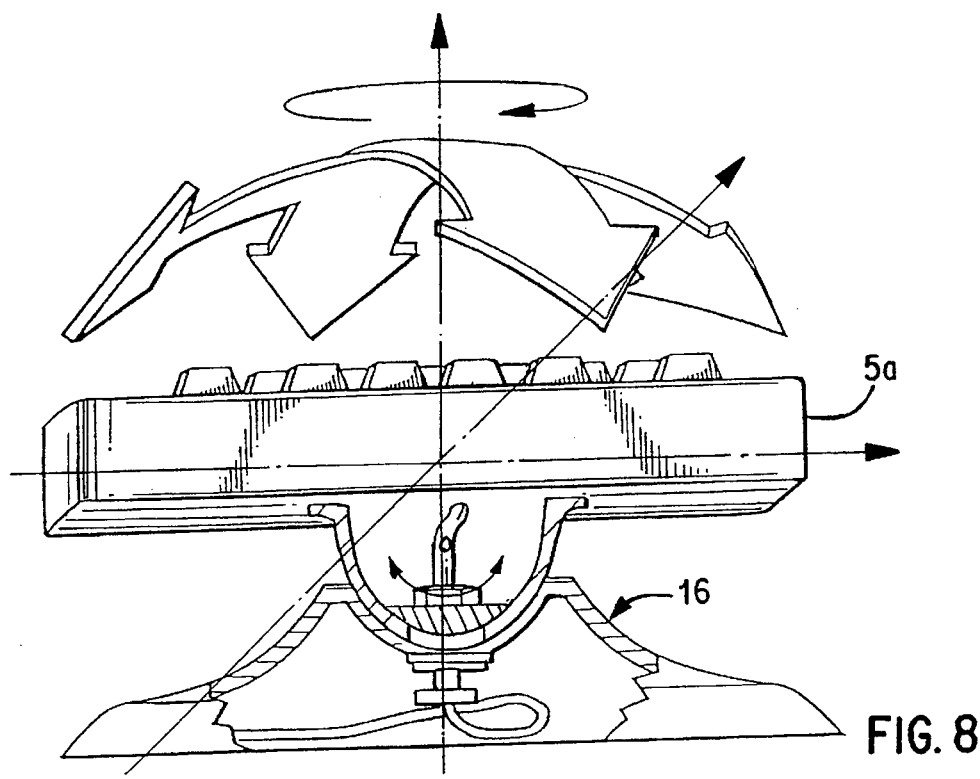
FIG. 8 is a partially cross sectional view of a rotatable joint and base arrangement suitable for use in the embodiment of FIGS. 5 and 6.
Figure 9:
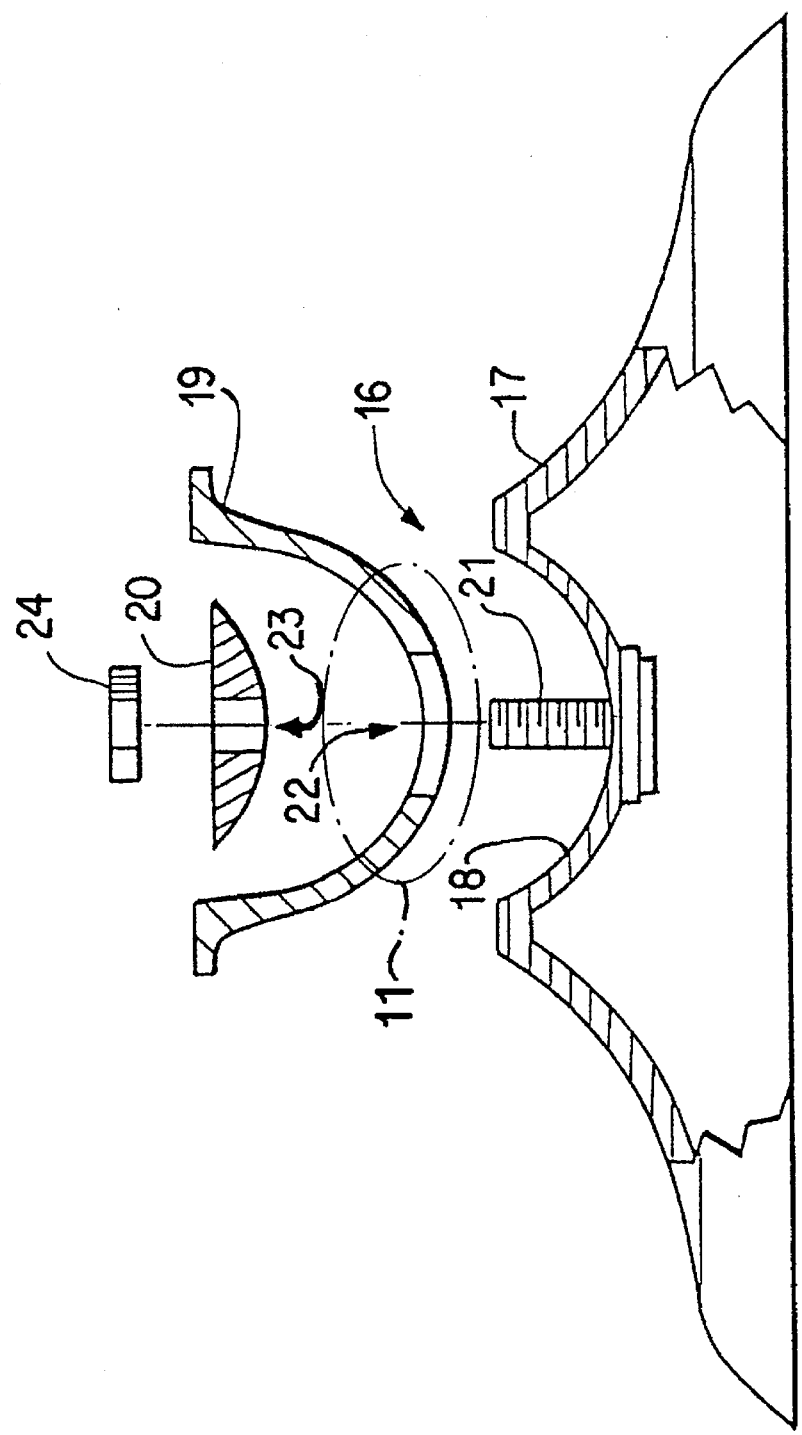
FIG. 9 is a partially cross sectional exploded view of a portion of the apparatus of FIG. 8.

In a preferred embodiment of the invention, a pivotable joint such as is commonly used with computer monitors is used to support the respective keyboard sections, either on separate supports or on a base assembly as illustrated in FIGS. 6, 8 and 9.

Referring to FIG. 8, a keyboard section 5a is shown supported on a pivotable joint, designated generally as 16, which permits the keyboard section to be rotated simultaneously about three mutually perpendicular axis, in an infinite number of positions, as indicated schematically by the arrows above the figure. As may also be seen from FIG. 8, with the type of joint illustrated, the keyboard section may be rotated in this manner substantially without resulting lateral or translational movement, due to the location of the pivot point near the surface of the keyboard sections themselves. Thus, the relative orientation of the keyboard sections may be adjusted quickly and easily, without disturbing their lateral spacing.

FIG. 9 is an enlarged, exploded view of a portion of the pivotable joint of FIG. 8, which better shows the constructional details. The joint 16 is comprised of three essential components: a support 17 having a concave spheroidal depression 18, a congruently shaped convex spheroidal upper member 19 adapted to be nested with the concave depression 18, and a keeper element 20, having a lower surface which is also congruent to the shape of the spheroidal upper member 19. Rigidly attached to the support 17 and extending upward therefrom is a threaded member 21. At the bottom of spheroidal upper member 19 is a opening 22 which has a diameter that is larger than the diameter of the threaded member 21.

When joint 16 is assembled, spheroidal upper member 19 is nested into the spheroidal depression 18, with threaded member 21 extending upwardly through opening 22. Keeper 20 is then placed on the threaded member which extends through hole 23. The keeper is held in place by nut 24, so that the spheroidal upper member 19 is held in frictional engagement between the keeper 20 and spheroidal depression 18 in support 17. Thus, the spheroidal upper member 19 is rotatable relative to support 17 around three mutually perpendicular axes, with the extent of rotation about the two horizontal axes being limited by the dimensions of the opening 22 in spheroidal member 19.

A joint of the type shown in FIG. 9 may be utilized separately for each of the respective keyboard sections 5a and 5b, as shown in FIG. 8. Alternatively, in a preferred embodiment, each of such joints may be mounted on a single base assembly.

Figure 7:
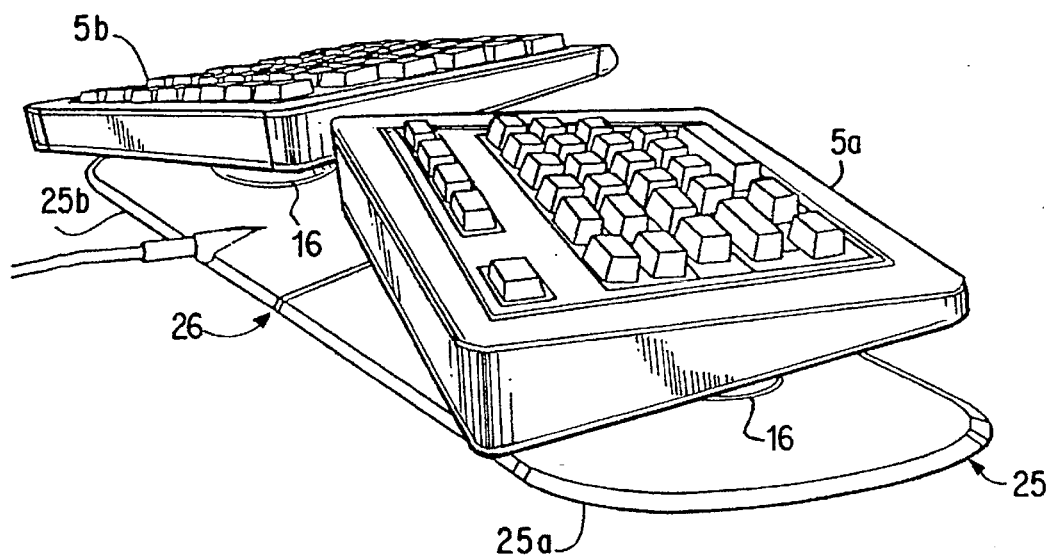
FIG. 7 is a perspective view of the embodiment of FIG. 6, viewed generally from behind the keyboard arrangement.

As shown in FIGS. 6 and 7, keyboard sections 5a and 5b are supported on the base assembly 25. The rotatable joints 16 supporting the respective keyboard sections, not shown in detail in FIGS. 6 and 7, are of the same construction shown in FIGS. 8 and 9. In order to provide for relative lateral movement between the keyboard sections, base assembly 25 is constructed in two parts 25a, 25b which have telescoped section 26, allowing relative movement of the parts 25a, 25b along an axis passing through the two joints 16. In FIG. 6, it can be seen that the telescoped sections 26 has been extended, while in FIG. 7, the two base parts 25a, 25b have been moved toward each other so that the telescoped section 26 is enclosed.

Figure 10:
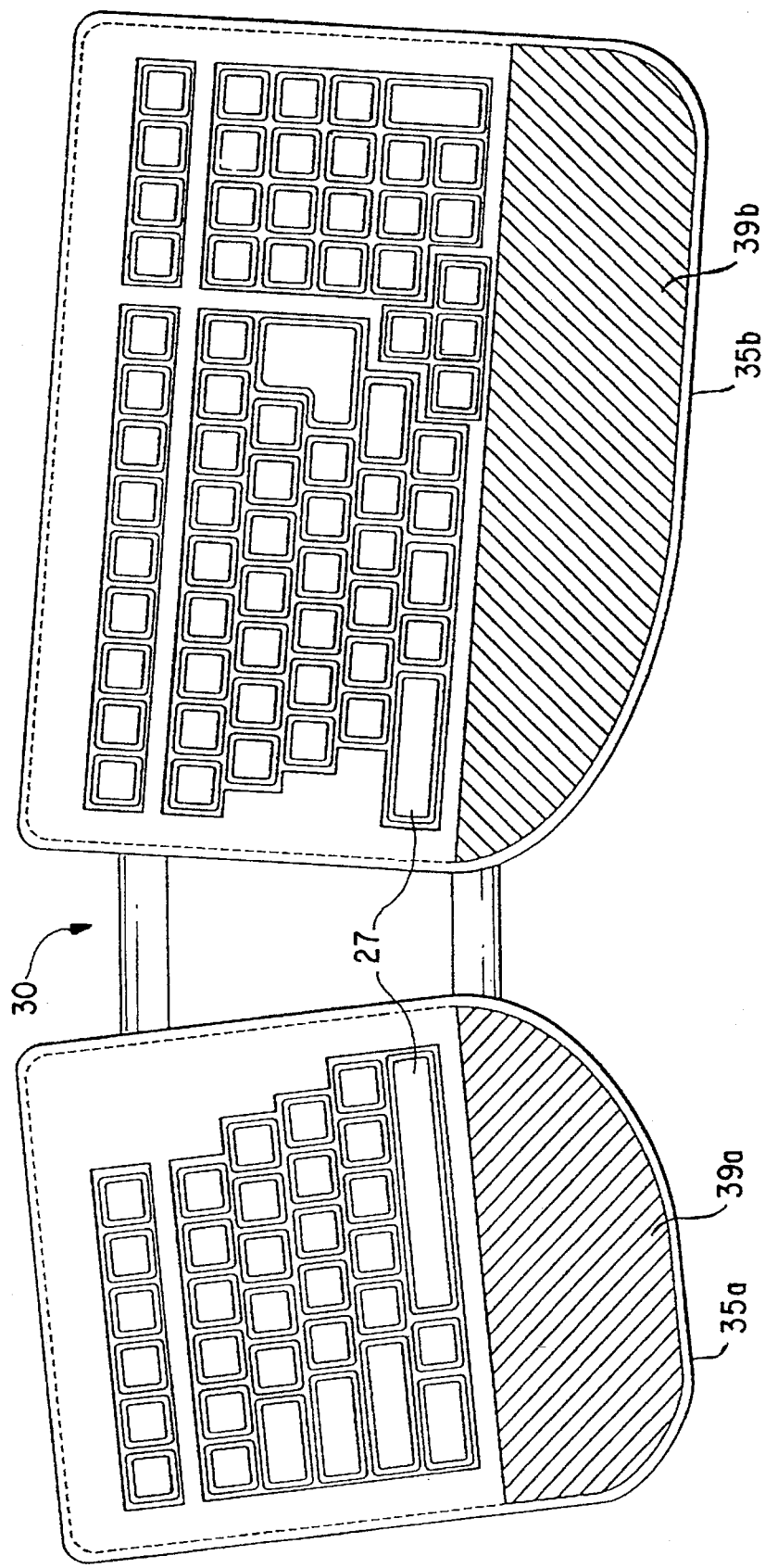
FIG. 10 is a top view of a bifurcated keyboard arrangement according to an exemplary embodiment of the present invention.

Referring to FIG. 10, an exemplary embodiment of the invention is illustrated wherein a keyboard 30 comprises a first section 35a and a second section 35b. These sections are similar to the sections 5a, 5b shown in FIGS. 2a and 2b. However, the sections 35a, 35b of the keyboard 30 each contain a respective palm rest 39a, 39b. That is, the section 35a has a palm rest 39a and the section 35b has a palm rest 39b. The palm rests 39a, 39b are for resting the palms of the hands on the keyboard 30. This facilitates ease of use of the keyboard 30 and diminishes the fatigue of the operator.

Figure 11B:
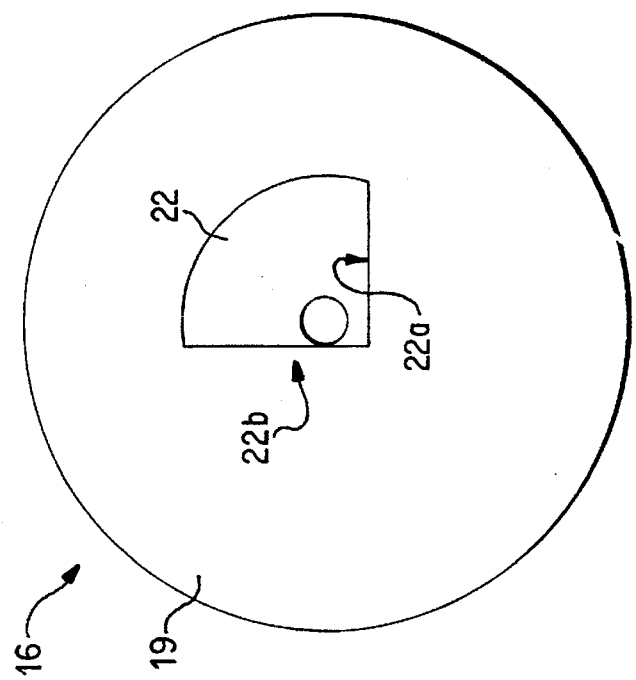
FIG. 11a and 11b show the construction details of supporting joints for the left and right keyboard sections respectively according to a preferred embodiment of the invention.
Figure 11A:
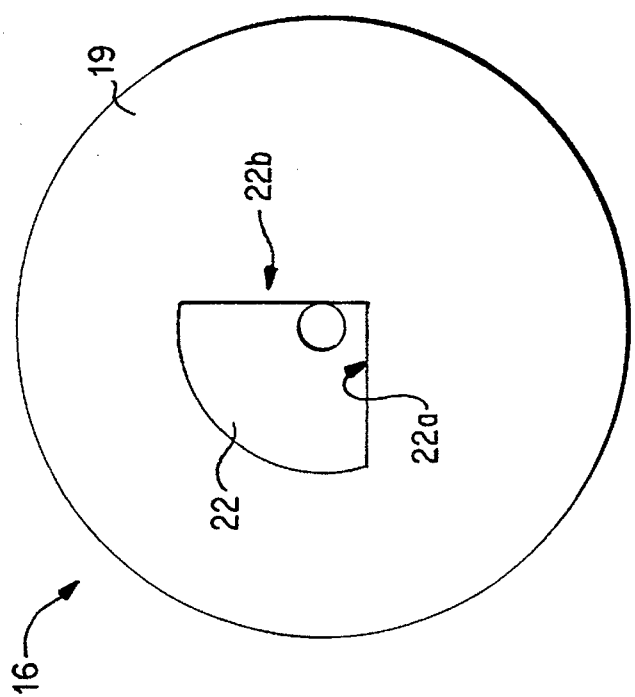

In a preferred embodiment of the invention which includes the type of joint shown in FIGS. 8 and 9, the opening 22 which defines the range or extent of articulation of the joint 16, has a shape which constrains movement of the keyboard sections to predetermined limits. In particular, FIGS. 11a and 11b show pie shaped, being defined by respective arcuate portions and substantially straight sides, 22A, 22B. The side 22a of the opening 22 limits forward a preferred configuration of the opening 22, which is essentially rotation of the keyboard section while the side 22b limits inward rotation of the sections. It should be understood that the dimensions indicated in FIGS. 11a and 11b are illustrative only, and that other dimensions may be used, depending on the size and configuration of the keyboard, as well as the desired range of articulation.

The limit of motion dictated by the size and shape of the opening as shown in FIGS. 11a and 11b incudes a rotation around the (vertical) X-axis of approximately 45 degrees to eliminate a cocked wrist posture (ulnar deviation). The sections may also be rocked upward in the middle, with the keyboard surfaces angled away from each other to form a "tent" configuration, which reduces or eliminates the need to force the hands into a flat (pronated) position. The openings of FIGS. 11a and 11b also allow the key surfaces to be tilted away from the operator, actually placing the fingertips slightly lower than the heel of the hand. Such "negative tilt" further straightens the wrist, which may be more comfortable for some operators. Rotation of the keyboard sections into a position with the surfaces canted toward each other, and rotation of the sections into a steep incline toward the operator (steep "positive tilt"), which most operators would find uncomfortable and potentially harmful, are prevented by the openings 22 depicted in FIGS. 11a and 11b. (A small amount of positive tilt, however, is permitted by the offset of the sides 22a toward the front of the keyboard, as depicted in FIGS. 11a and 11b.) It will of course be appreciated that other shapes and sizes of openings can also be utilized within the scope of the invention, to limit the range of movement of the joint in any desired fashion, with FIGS. 11a and 11b being illustrative.

Figure 12:
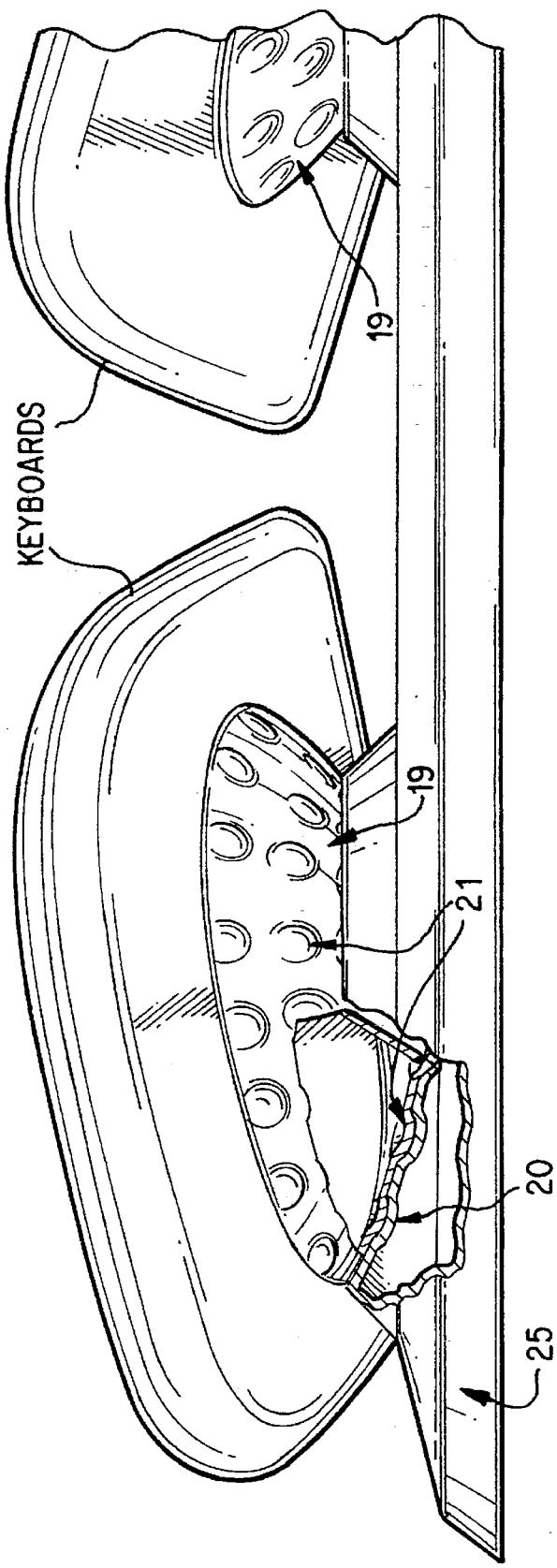
FIG. 12 is a partially broken away perspective view of another preferred embodiment of the invention.

In a further embodiment of the invention, the concave and convex surfaces of the joint 16 (FIGS. 8 and 9) which are nested against each other are provided with respective shallow "bumps" 21 and corresponding "dimples" 20 as shown in FIG. 12. (FIG. 12 shows the bumps 21 on the convex surface and the dimples on the concave surface; it will be appreciated, of course, that this allocation of bumps and dimples may be reversed, with bumps on the concave surface and dimples on the convex surface.) In this manner, a plurality of defined positions provide the user with a feeling of "finiteness" (that is, a feeling of having "arrived" at a preset position) which may be welcomed by many such users. The subtle "click stop" response as the bumps mate with corresponding dimples adds to the stability of the keyboard and may also provide a measure of "reproduceability" for particular preferred keyboard settings, while still retaining a high level of adjustability within the permitted range of overall movement.

According to still another feature of the present invention, one or both of the two keys located under the natural position of the thumbs on the respective right and left keyboard sections (for example, keys 27 in FIG. 10) may be designated as a backspace key. Moreover, since these keys may also advantageously be designated as spacebar keys, in another embodiment of the invention either or both of them may be divided into two keys, with the "outboard" key (that is, the key located nearer the outside edge of the keyboard section in question) designated as a backspace key, and the inboard key being designated as a space bar. Obviously, of course, the opposite designation of these keys (backspace inboard; space bar outboard) is also possible.

Standard computer keyboards require operators to move their right hand away from the "home" row position to seek the backspace key, which is located as much as three inches over and in the upper right corner of the key array. Although such movement can be mastered by a skilled typist, because the backspace key is frequently used, this arrangement remains a source of mistakes and delays, especially when the backspace key is the same size as the letter keys, as on many keyboards.

The significance of the latter problem is substantially increased when the standard arrangement of the backspace key is used in a variable geometry keyboard, in which a potential infinite range of spacial orientation of the keyboard sections results in a significant variation of the motion necessary to reach the backspace key. Moreover, in order to relieve muscle tension associated with a particular keyboard orientation over an extended period of use, a particular operator may find it desirable to change the keyboard orientation from time to time, which of course modifies the necessary relative "backspace motion" with each such change of orientation. Thus, the location of the backspace key adjacent the natural position of the right or left thumbs as shown in FIG. 10, is particularly desirable in the case of a variable geometry keyboard such as that provided by the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A keyboard arrangement of the type having a plurality of keys arranged in a keyboard surface, each key corresponding to a letter, number, symbol, function or other information, said keyboard arrangement being adapted for entry of information into a receiving unit, and comprising:
    a first keyboard section bearing a first portion of said keys;
    a second keyboard section bearing a second portion of said keys; and
    a base arrangement for supporting said keyboard sections;
    each of said first and second keyboard sections being supported on said base arrangement by a joint which is rotatable about three orthogonal axes, said joint having a spheroidal convex surface which is in nested engagement with a spheroidal concave surface congruent thereto, one of said convex and concave surfaces having an opening therein, and the other of said convex and concave surfaces having a member fixed thereto which projects through said opening, thereby limiting an extent of rotation of said joint;
    wherein said opening has a two dimensional shape which permits rotation of said joint about three orthogonal axes, a first of which axes coincides with an axis of said member and a second and third which axes are perpendicular to the axis of said member and are substantially perpendicular to each other, and which shape is adapted to constrain movement of said joint to achieve a desired predetermined rotational range about said three orthogonal axes.

2. Keyboard arrangement according to claim 1 wherein a perimeter of said opening is defined by an arcuate portion for permitting rotation of said joint about said at least two orthogonal axes, and a substantially truncated portion for limiting a range of rotation about at least one axis.

3. Keyboard arrangement according to claim 2 wherein said opening is substantially pie shaped, being defined by an arcuate portion and at least two sides which are substantially straight.

4. Keyboard arrangement according to claim 3 wherein a first of said arms is offset from a center point of said surface having the opening therein, for permitting limited rotation of said keyboard section toward a frontward direction.

5. Keyboard arrangement according to claim 4 wherein a second of said arms is situated adjacent a center point of said surface having the opening therein, for constraining rotation of one of said keyboard sections toward the other keyboard section.

6. Keyboard arrangement according to claim 5 wherein said first and second arms define an angle of approximately 90 degrees.

7. A keyboard arrangement according to claim 1, wherein:
    said joint has means for biasing said spheroidal convex surface against said spheroidal concave surface; and
    one of said concave and convex surfaces has a plurality of bumps thereon, and another of said concave and convex surfaces has a plurality of dimples thereon, said bumps and dimples being arranged in corresponding patterns so that said bumps can nest with said dimples at a plurality of predetermined relative orientations of said concave and convex surfaces.

8. A keyboard arrangement according to claim 1, wherein at least one of said first and second keyboard sections has a backspace key arranged in a position adjacent a natural position of a user's thumb when said user's hand is placed over said at least one keyboard section, with its palm face downward and fingers extending forward.

9. A keyboard arrangement of the type having a plurality of keys arranged on a keyboard surface, each key corresponding to a letter, number, symbol, function or other information, said keyboard arrangement being adapted for entry of information into a receiving unit, comprising:
    a first keyboard section bearing a first portion of said keys;
    a second keyboard section bearing a second portion of said keys;
    said first and second key board sections being physically detached from and movable relative to each other;
    a base unit for supporting said keyboard sections; and
    each of said first and second keyboard sections being supported on said base unit by respective first and second pivotal means for permitting said keyboard section to rotate relative to the base unit in three mutually perpendicular planes substantially without translational movement of a surface thereof which bears said keys, at a fixed lateral position of said keyboard section relative to said base unit.

10. Keyboard arrangement according to claim 9 wherein said pivotal means comprises a ball and socket joint.

11. Keyboard arrangement according to claim 9 wherein said pivotal means comprises a spheroidal concave surface and a spheroidal convex surface congruent to said spheroidal concave surface and nested in frictional engagement therewith, one of said concave surface and said convex surface being rigidly coupled to said keyboard section, and the other of said concave surface and said convex surface being rigidly coupled to said base arrangement.

12. Keyboard arrangement according to claim 11 wherein said spheroidal convex surface has a center point which is adjacent said keyboard section.

13. Keyboard arrangement according to claim 11 wherein each of said first and second keyboard sections comprises a palm rest which extends towards an operator of said keyboard surface, whereby spatial orientation of said palm rest may be modified by modifying orientation of said keyboard section.

* * * * *